(12) United States Patent
Ishii et al.

(10) Patent No.: US 9,701,357 B2
(45) Date of Patent: Jul. 11, 2017

(54) STRADDLE-TYPE VEHICLE

(71) Applicant: KAWASAKI JUKOGYO KABUSHIKI KAISHA, Kobe-shi, Hyogo (JP)

(72) Inventors: Hiroshi Ishii, Kobe (JP); Daisuke Saeki, Kobe (JP); Tomo Yamamoto, Kobe (JP)

(73) Assignee: Kawasaki Jukogyo Kabushiki Kaisha, Kobe-shi, Hyogo (JP)

( * ) Notice: Subject to any disclaimer, the term of this patent is extended or adjusted under 35 U.S.C. 154(b) by 0 days.

(21) Appl. No.: 14/819,153

(22) Filed: Aug. 5, 2015

(65) Prior Publication Data
US 2016/0046344 A1 Feb. 18, 2016

(30) Foreign Application Priority Data
Aug. 18, 2014 (JP) .................. 2014-165807

(51) Int. Cl.
*B62J 35/00* (2006.01)
*B62K 19/30* (2006.01)
*B62K 11/04* (2006.01)

(52) U.S. Cl.
CPC ............... *B62J 35/00* (2013.01); *B62K 11/04* (2013.01); *B62K 19/30* (2013.01)

(58) Field of Classification Search
CPC ........... B62J 35/00; B62K 11/04; B62K 19/30

USPC ......................................................... 280/835
See application file for complete search history.

(56) References Cited

U.S. PATENT DOCUMENTS
9,248,879 B2 * 2/2016 Nishida .................... B62J 35/00

FOREIGN PATENT DOCUMENTS
JP          2012136156 A   *   7/2012

* cited by examiner

*Primary Examiner* — Naeem Haq
*Assistant Examiner* — Felicia L Brittman
(74) *Attorney, Agent, or Firm* — Alleman Hall Creasman & Tuttle LLP

(57) ABSTRACT

A straddle-type vehicle comprises a pair of vehicle body frames arranged in a vehicle width direction of a vehicle body and extending in a vehicle length direction of the vehicle body, a fuel tank placed between the pair of vehicle body frames, a tank bracket fastened to an upper surface of the fuel tank, and a support member which couples the tank bracket to at least one of the pair of vehicle body frames. The support member includes a frame coupling section detachably coupled to a mounting section provided on at least one of the pair of vehicle body frames, and a tank coupling section placed inward in the vehicle width direction relative to the frame coupling section and detachably coupled to the tank bracket.

11 Claims, 5 Drawing Sheets

STRADDLE-TYPE VEHICLE

CROSS-REFERENCE TO THE RELATED APPLICATION

This application claims priority to and the benefit of Japanese Patent Application No. 2014-165807, filed Aug. 18, 2014, the entire disclosure of which is incorporated herein by reference.

BACKGROUND OF THE INVENTION

Field of the Invention

The present invention relates to a straddle-type vehicle such as a motorcycle or an all-terrain vehicle (ATV).

Description of the Related Art

In an exemplary straddle-type vehicle, the rear portion of a fuel rank is placed between a pair of vehicle body frames in the vehicle width direction of a vehicle body. For example, Japanese Laid-Open Patent Application Publication No. 2012-136156 discloses a straddle-type vehicle in which a mounting bracket is fastened to the upper wall of the rear portion of a fuel tank. The pair of vehicle body frames include a pair of protruding sections, respectively, extending inward in the vehicle width direction toward the mounting bracket. The fuel tank is placed on the pair of vehicle body frames from above and then the mounting bracket is fastened to the pair of protruding sections. In this way, the fuel tank is supportedly mounted to the pair of vehicle body frames.

SUMMARY OF THE INVENTION

In the above-described tank support structure, however, it is necessary to set the width of the rear portion of the fuel tank to be smaller than a spacing (distance) between the pair of protruding sections. Therefore, it is difficult to increase the volume of the fuel tank.

According to an aspect of the present invention, a straddle-type vehicle comprises a pair of vehicle body frames arranged in a vehicle width direction of a vehicle body and extending in a vehicle length direction of the vehicle body; a fuel tank placed between the pair of vehicle body frames; a tank bracket fastened to an upper surface of the fuel tank; and a support member which couples the tank bracket to at least one of the pair of vehicle body frames. The support member includes a frame coupling section detachably coupled to a mounting section provided on at least one of the pair of vehicle body frames; and a tank coupling section placed inward in the vehicle width direction relative to the frame coupling section and detachably coupled to the tank bracket.

In accordance with this configuration, the support member is detachably mounted to the vehicle body frames and the fuel tank. The fuel tank is placed from above into a region between the pair of vehicle body frames in a state in which the support member is detached from the vehicle body frames, and then the frame coupling section of the support member is coupled to the vehicle body frames. In this way, the fuel tank is supportedly mounted to the vehicle body frames. In this assembly sequence, even when the width of the fuel tank is increased to be close to the spacing between the vehicle body frames, it becomes possible to prevent an interference of the fuel tank with the vehicle body frames and the members fastened to the vehicle body frames by placing the fuel tank between the vehicle body frames in the above-described manner. Therefore, the volume of the fuel tank of the straddle-type vehicle can be increased.

The above and further objects, features, and advantages of the present invention will more fully be apparent from the following detailed description of a preferred embodiment with the accompanying drawings.

DETAILED DESCRIPTION OF THE EMBODIMENTS

Hereinafter, the embodiment of the present invention will be described with reference to the drawings. Throughout the drawings, the same or corresponding components are designated by the same reference symbols, and will not be described repeatedly. A forward and rearward direction corresponds with the vehicle length direction of a vehicle body of the straddle-type vehicle, and a rightward and leftward direction corresponds with the vehicle width direction of the vehicle body. The term "inward in the vehicle width direction" is defined as a direction closer to the center of the vehicle body in the vehicle width direction, while the term "outward in the vehicle width direction" is defined as a direction away from the center of the vehicle body in the vehicle width direction.

Figure 1:
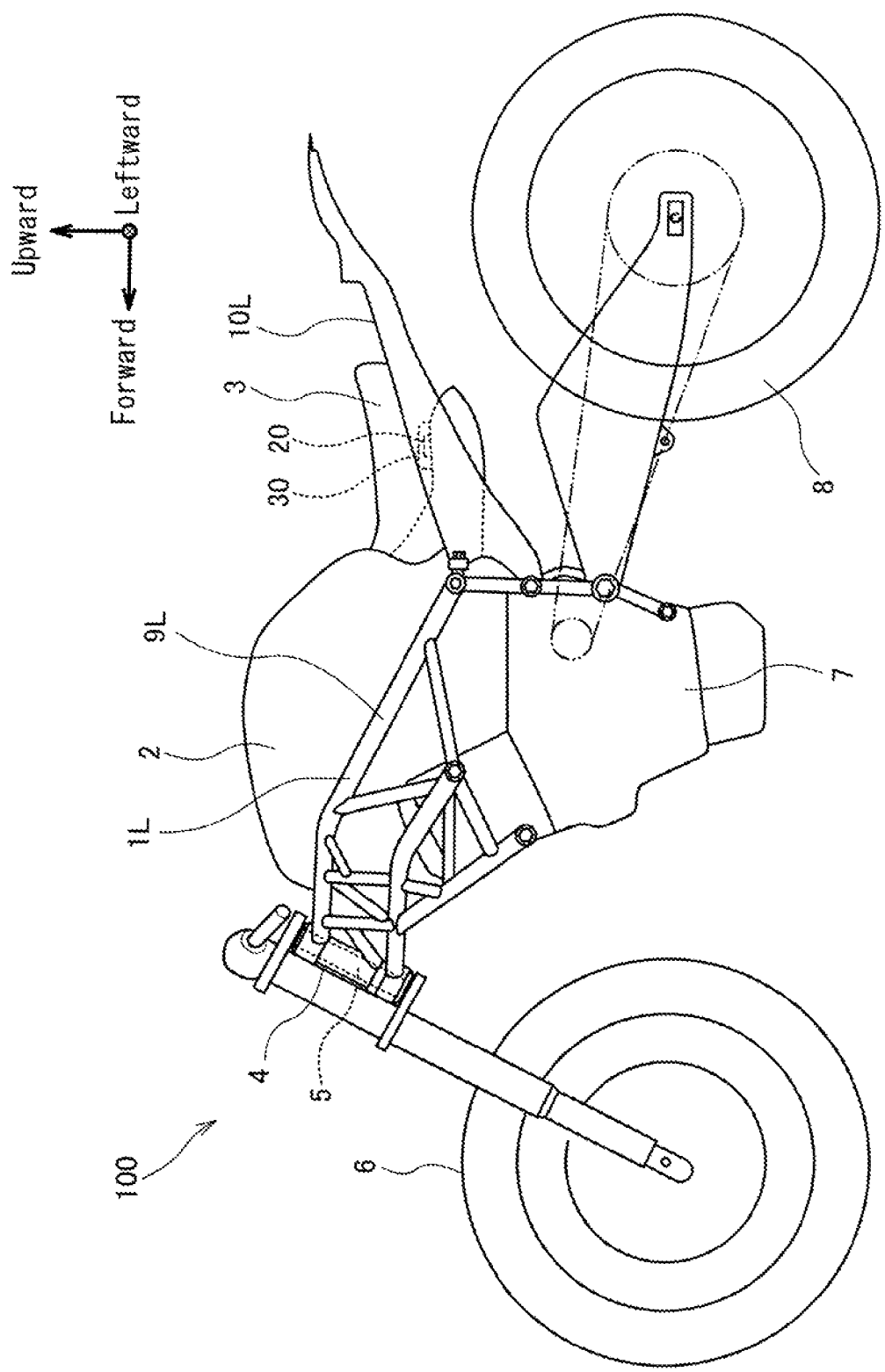
FIG. 1 is a left side view of a straddle-type vehicle according to an embodiment.
Figure 2:
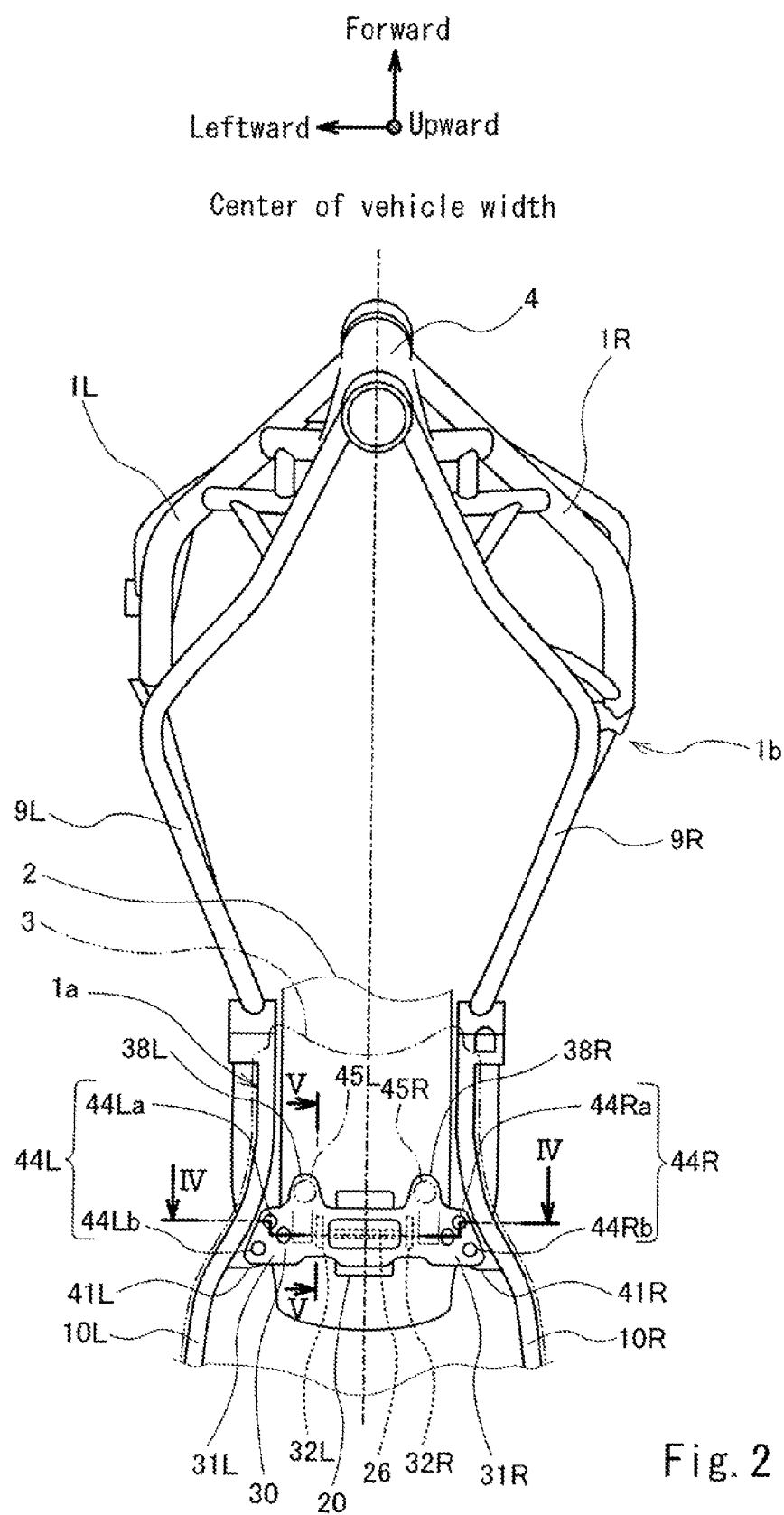
FIG. 2 is a plan view of a tank support structure applied to the straddle-type vehicle of FIG. 1.

A motorcycle which is exemplarily shown in FIG. 1 is a suitable example of a straddle-type vehicle 100. The straddle-type vehicle 100 includes a pair of right and left vehicle body frames 1R, 1L (right vehicle body frame 1R is shown in FIG. 2), a fuel tank 2, and a seat 3. The pair of vehicle body frames 1R, 1L are arranged in the vehicle width direction and extend in the vehicle length direction. The pair of right and left vehicle body frames 1R, 1L are symmetric in the vehicle width direction with respect to the center of the vehicle body in the vehicle width direction. The pair of right and left vehicle body frames 1R, 1L extend separately rearward from a head pipe 4 supporting a steering shaft 5 which changes the direction of a front wheel 6. The fuel tank 2 reserves fuel supplied to an engine 7 for driving a rear wheel 8. The engine 7 is mounted to the pair of right and left vehicle body frames 1R, 1L. The engine 7 is covered with the fuel tank 2 from above. A seat 3 is placed rearward relative to the fuel tank 2.

The left vehicle body frame 1L includes a front frame 9L extending rearward from the head pipe 4, and a rear frame 10L extending rearward from the rear portion of the front frame 9L. The rear frame 10L is manufactured separately from the front frame 9L and coupled to the rear portion of the front frame 9L by use of a coupling member (e.g., bolt). As shown in FIG. 2, the right vehicle body frame 1R includes a front frame 9R and a rear frame 10R, and the rear frame 10R is manufactured and coupled to the front frame 9R in the same manner as that for the front and rear frames 9L, 10L of the left vehicle body frame 1L. The pair of front frames 9R, 9L are welded to the head pipe 4 and thus integrated. The pair of rear frames 10R, 10L are manufactured separately.

As shown in FIG. 2, a "frame spacing" is not constant in the vehicle length direction. The term "frame spacing" is defined as a spacing or distance in the vehicle width direction between the pair of right and left vehicle body frames 1R, 1L, especially between the upper edges of the frames 1R, 1L, unless otherwise noted. The intermediate portions of the pair of vehicle body frames 1R, 1L in the vehicle length direction define a smaller-spacing section 1a which has a smaller frame spacing. The frame spacing increases as the vehicle body frames 1R, 1L extend rearward from the head pipe 4, decreases as they extend rearward from a larger-spacing section 1b, and increases again as they extend rearward from the smaller-spacing section 1a.

Except for a region in the vicinity of the head pipe 4 (to be precise, in a region that is forward relative to the larger-spacing section 1b), the frame spacing is smallest at the smaller-spacing section 1a. The smaller-spacing section 1a extends from the rear end portions of the front frames 9R, 9L to the front end portions of the rear frames 10R, 10L. The pair of front frames 9R, 9L constitute a section located in front of the smaller-spacing section 1a, while the pair of rear frames 10R, 10L constitute a section located rearward relative to the smaller-spacing section 1a.

As shown in FIGS. 1 and 2, the seat 3 is mounted to the rear frames 10R, 10L in such a manner that the front portion of the seat 3 is placed on the upper portion of the smaller-spacing section 1a. A rider is seated on the front portion of the seat 3 in a straddle posture, and grounds one or both of the rider's feet to prevent lateral falling of the vehicle body, during a temporal stop of the straddle-type vehicle 100. By providing the smaller-spacing section 1a, the width of the front portion of the seat 3 (hereinafter will be simply referred to as "rider seat width") can be reduced, and the rider is not forced to widely open their thighs. Therefore, the rider straddling the seat 3 can easily ground their feet. Thus, it becomes possible to lessen a physical burden on the rider to prevent the vehicle body from falling sideways.

At least a portion of the fuel tank 2 is placed between the pair of right and left vehicle body frames 1R, 1L and below the upper edges of the frames 1R, 1L (hereinafter this portion will be referred to as "frame accommodation portion"). The fuel tank 2 is mounted to the vehicle body frames 1R, 1L in such a manner that the front portion of the fuel tank 2 protrudes upward from the front frames 9R, 9L and the rear end portion of the fuel tank 2 constitutes the frame accommodation portion. The rear end portion of the fuel tank 2 extends to a location that is rearward relative to the smaller-spacing section 1 and is covered by the front portion of the seat 3. Since the fuel tank 2 is expanded rearward to partially overlap with the seat 3 when viewed from above, the volume of the fuel tank 2 (hereinafter will be simply referred to as "tank volume") can be increased.

If the width of the fuel tank 2 (hereinafter will be simply referred to as "tank width") is increased, then the tank volume can be increased. In that case, if the tank width can be increased without increasing the frame spacing, the rider can easily turn the vehicle body and easily ground their feet, which is an advantage. If the frame spacing is increased, then the rider seat width is increased correspondingly, and as a result, the rider is forced to widely open their legs. In this structure, the rider cannot easily ground their feet.

The straddle-type vehicle 100 incorporates a tank support structure shown in FIG. 2. By use of this tank support structure, the tank width and hence the tank volume can be increased. In addition, the frame spacing is not increased, and the rider can easily turn the vehicle body and can easily ground their feet. In this tank support structure, a tank bracket 20 is attached to the upper surface of the fuel tank 2 (especially, the frame accommodation portion). The tank bracket 20 is coupled to the pair of vehicle body frames 1R, 1L via a support member 30. The support member 30 is detachably coupled to the vehicle body frames 1R, 1L. The support member 30 protrudes outward in the vehicle width direction from the tank bracket 20 and the fuel tank 2. The support member 30 is coupled to the vehicle body frames 1R, 1L in locations that are outward in the vehicle width direction relative to the fuel tank 2. This tank support structure also serves as a seat support structure. The front portion of the seat 3 is supported by the support member 30.

The tank support structure is assembled according to, for example, the following steps (1) to (4). (1) The support member 30 is coupled to the tank bracket 20. (2) The fuel tank 2 with the support member 30 is placed on the vehicle body frames 1R, 1L from above such that the frame accommodation portion of the fuel tank 2 is accommodated into a region between the vehicle body frames 1R, 1L. (3) The support member 30 is coupled to the vehicle body frames 1R, 1L. (4) The seat 3 is mounted to the vehicle body frames 1R, 1L from above such that the front portion of the seat 3 is placed on the support member 30. Hereinafter, the configuration of the tank support structure will be described in conjunction with steps (1) to (4).

Figure 3:
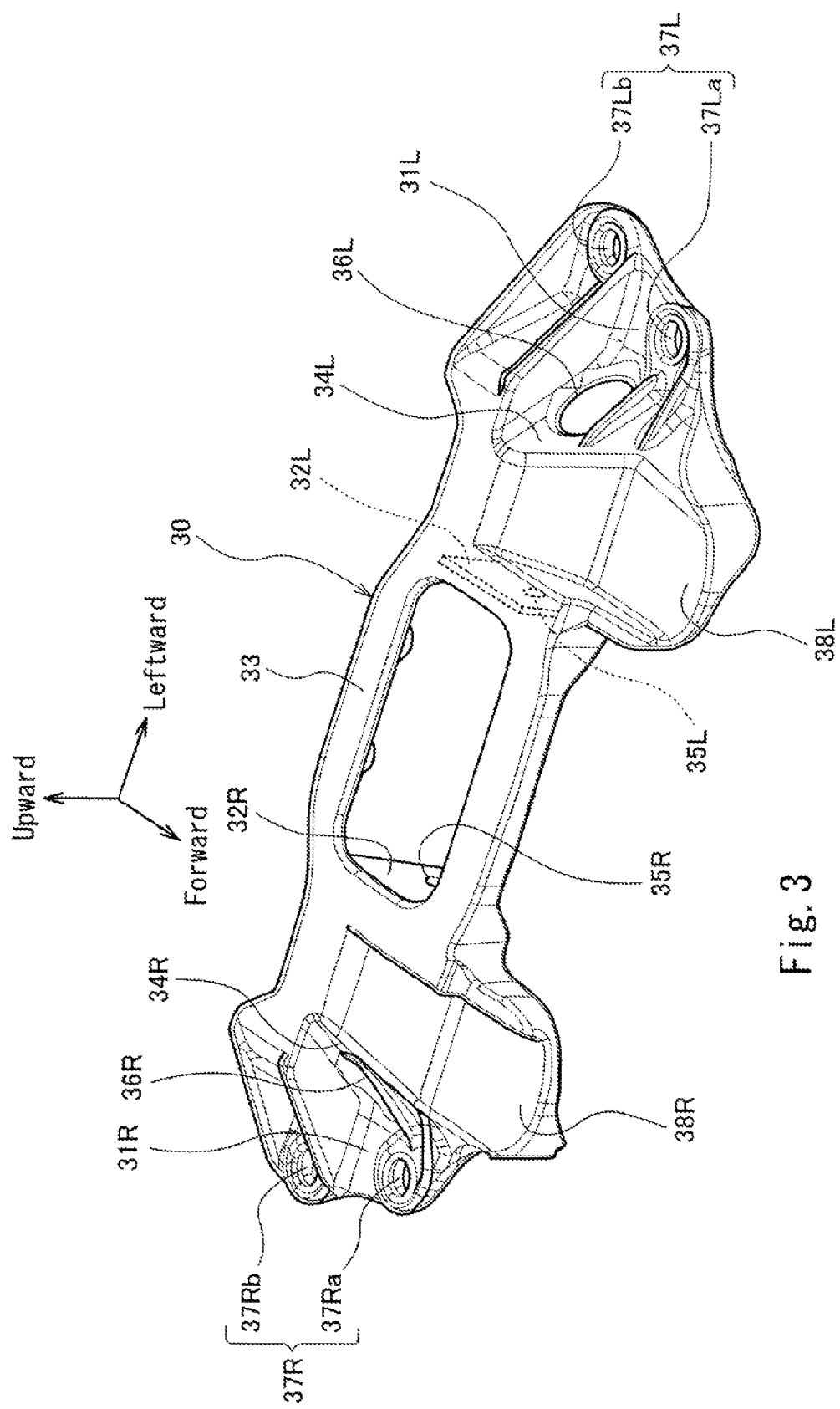
FIG. 3 is a perspective view of a support member of FIG. 2.

The configuration corresponding to step (1) will now be described. As shown in FIG. 3, the support member 30 includes a pair of frame coupling sections 31R, 31L, and a pair of tank coupling sections 32R, 32L. The pair of frame coupling sections 31R, 31L are detachably coupled to the pair of vehicle body frames 1R, 1L, respectively. The pair of tank coupling sections 32R, 32L are detachably coupled to the tank bracket 20.

Figure 4:
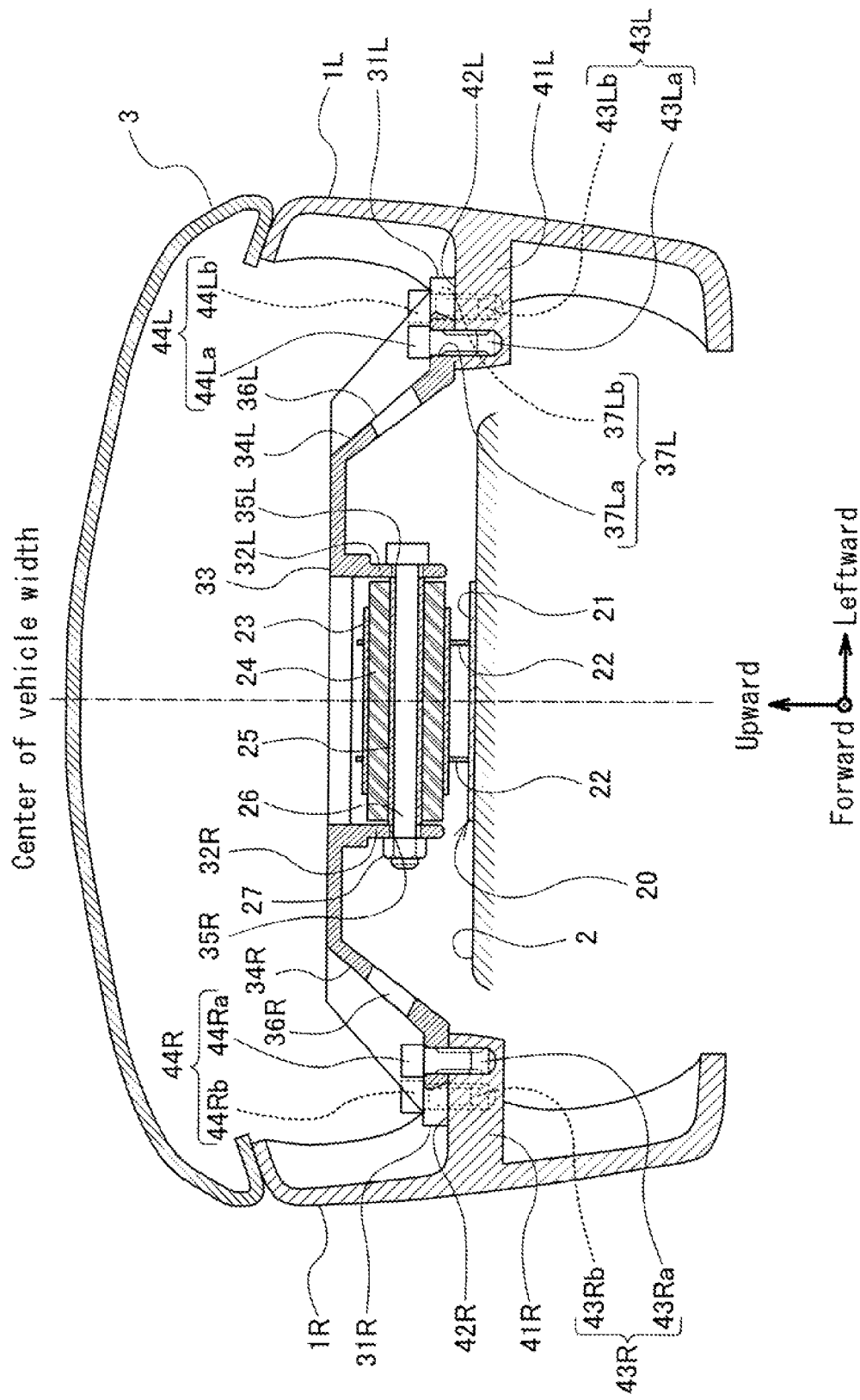
FIG. 4 is a cross-sectional view of the tank support structure taken along a line IV-IV of FIG. 2.

As shown in FIG. 4, the support member 30 as a whole has a cross-section of a substantially hat shape. The support member 30 includes a bridge portion 33 extending in the vehicle width direction above the pair of frame coupling sections 31R, 31L, and a pair of longitudinal wall portions 34R, 34L vertically connecting the outer edge portions of the bridge portion 33 in the vehicle width direction to the inner edge portions of the pair of frame coupling sections 31R, 31L in the vehicle width direction, respectively. The pair of frame coupling sections 31R, 31L extend outward in the vehicle width direction from the lower edge portions of the pair of longitudinal wall portions 34R, 34L, respectively. The pair of tank coupling sections 32R, 32L protrude downward from the bridge portions 33, respectively. The pair of tank coupling sections 32R, 32L are located inward in the vehicle with direction relative to the pair of longitudinal wall portions 34R, 34L, respectively.

The tank bracket 20 includes a plate-shaped base portion 21 secured to the upper surface of the rear portion of the fuel tank 2, and a pair of side wall portions 22 extending upward from the base portion 21. The pair of side wall portions 22 are placed to be spaced apart from each other in the vehicle width direction. The tank bracket 20 also includes a cylindrical portion 23 extending in the vehicle width direction and penetrating the pair of side wall portions 22.

In step (1), a cylindrical damper member 24 is internally fitted to the cylindrical portion 23 of the tank bracket 20. A cylindrical collar 25 is internally fitted to the cylindrical damper member 24. The support member 30 is provided on the tank bracket 20 in such a manner that the members 22 to 25 are sandwiched between the pair of tank coupling sections 32R, 32L. The pair of tank coupling sections 32R, 32L have a pair of pivot insertion holes 35R, 35L, respectively, penetrating therethrough in the vehicle width direction. The pair of pivot insertion holes 35R, 35L are in communication with inside of the collar 25. A pivot shaft 26 is inserted into the collar 25 and fastened to the tank coupling sections 32R, 32L. In this state, the axis of the pivot shaft 26 extends in the vehicle width direction, and the fuel tank 2 is coupled to the support member 30 such that the fuel tank 2 is angularly displaceable around the axis of the pivot shaft 26.

The pivot shaft 26 is, for example, a through bolt including a head portion, a shaft portion, and a male thread portion. In this case, the shaft portion of the pivot shaft 26 is inserted into the pivot insertion holes 35R, 35L and the collar 25, the head portion is pressed against the outer surface of one of the tank coupling sections 32R, 32L, the male thread portion protrudes outward in the vehicle width direction from the other of the tank coupling sections 32R, 32L, and a nut 27 is tightened into the male thread portion. By loosening the nut 27 and pulling out the pivot shaft 26, the support member 30 can be detached from the bracket 20.

The pair of longitudinal wall portions 34R, 34L include through holes 36R, 36L, respectively, penetrating therethrough in the vehicle width direction. Therefore, by inserting the pivot shaft 26 from a location that is outward in the vehicle width direction relative to one of the through holes 36R, 36L, into the one of the through holes 36R, 36L, one of the pivot insertion holes 35R, 35L, and the collar 25 in this order, the pivot shaft 26 can be easily set. Also, the pivot shaft 26 can be fastened while looking at the other of the coupling sections 32R, 32L, from a location that is outward in the vehicle width direction relative to the other of the through holes 36R, 36L. Even when the support member 30 has the cross-section of the hat shape and the tank coupling sections 32R, 32L are hidden by the longitudinal wall portions 34R, 34L, respectively, the operation for coupling the tank bracket 20 to the tank coupling sections 32R, 32L can be easily carried out.

The configuration corresponding step (2) will now be described. As shown in FIG. 2, the left vehicle body frame 1L is provided with a mounting section 41L in a location that is rearward relative to the intermediate portion of the left vehicle body frame 1L, defining the smaller-spacing section 1a, and the mounting section 41L protrudes inward in the vehicle width direction from the inner surface of the left vehicle body section 1L. The right vehicle body frame 1R is provided with a mounting section 41R in the same manner as that for the mounting section 41L of the vehicle body frame 1L. A spacing (distance) between the pair of mounting sections 41R, 41L in the vehicle width direction is equal to or larger than the frame spacing at the smaller-spacing section 1a.

In step (2), the rear portion of the fuel tank 2 is accommodated into a region between the pair of vehicle body frames 1R, 1L, from above. In a region in the vicinity of the mounting sections 41R, 41L, the fuel tank 2 is accommodated into a region between the pair of mounting sections 41R, 41L, from above. The support member 30 protrudes outward in the vehicle width direction from the fuel tank 2 in a state in which the support member 30 is coupled to the tank bracket 20. The pair of frame coupling sections 31R, 31L are located on the outer end portions of the support member 30 in the vehicle width direction, respectively. The fuel tank 2 does not interfere with each of the pair of mounting sections 41R, 41L, while the pair of frame coupling sections 31R, 31L are placed on the mounting sections 41R, 41L to overlap with the mounting sections 41R, 41L, respectively, from above.

The configuration corresponding to step (3) will now be described. As shown in FIG. 4, the left frame coupling section 31L has a plate shape including a flat upper surface and a flat lower surface which are parallel to each other, and includes one or more coupling member insertion holes 37L penetrating therethrough vertically. In contrast, the left mounting section 41L includes a horizontal placement surface 42L, and one or more coupling member engagement holes 43L which open in the placement surface 42L. The lower surface of the flame coupling section 31L and the placement surface 42L of the left mounting section 41L are an interface of the frame coupling section 31L and of the mounting section 41L which are joined together. The lower surface of the flame coupling section 31L is placed on the placement surface 42L of the mounting section 41L, and the coupling member insertion hole 37L is aligned with the corresponding coupling member engagement hole 43L. The right frame coupling section 31R has the same configuration as that of the left frame coupling section 31L. The right frame coupling section 31R and the right mounting section 41R have the same configurations as those of the left frame coupling section 31L and the left mounting section 41L, respectively.

In step (3), in the left frame coupling section 31L, one or more coupling members 44L are inserted into the corresponding coupling member insertion holes 37L and the corresponding coupling member engagement holes 43L, from above. The coupling member 44L is, for example, a tap bolt. In this case, the coupling member engagement hole 43L is a female thread provided on the rear frame 10L preliminarily by a tap process or a nut insertion process. The coupling member 44L is threadedly engaged with the coupling member engagement hole 43L, and the head portion of the tap bolt is tightened against the upper surface of the frame coupling section 31L. In the same manner, in the right frame coupling section 31R, one or more coupling members 44R are inserted into the corresponding coupling member insertion holes 37R and the corresponding coupling member engagement holes 43R, from above. By disengaging the coupling members 44R, 44L, the support member 30 can be disengaged from the vehicle body frames 1R, 1L.

The fuel tank 2 is angularly displaceably coupled to the pair of vehicle body frames 1R, 1L via the support member 30. The axis of the pivot shaft 26 is set in the rear portion of the fuel tank 2. The front portion of the fuel tank 2 can be pivoted upward around the pivot shaft 26 in a state in which the fuel tank 2 is coupled to the vehicle body frames 1R, 1L. This makes it possible to carry out the operation for assembling the fuel system of the engine 7 and the operation for maintaining the fuel system, in the state in which the fuel tank 2 is coupled to the vehicle body frames 1R, 1L. After the operation for assembling the fuel system of the engine 7 is finished, the front portion of the fuel tank 2 is lowered down and mounted to the vehicle body frames 1R, 1L.

Figure 5:
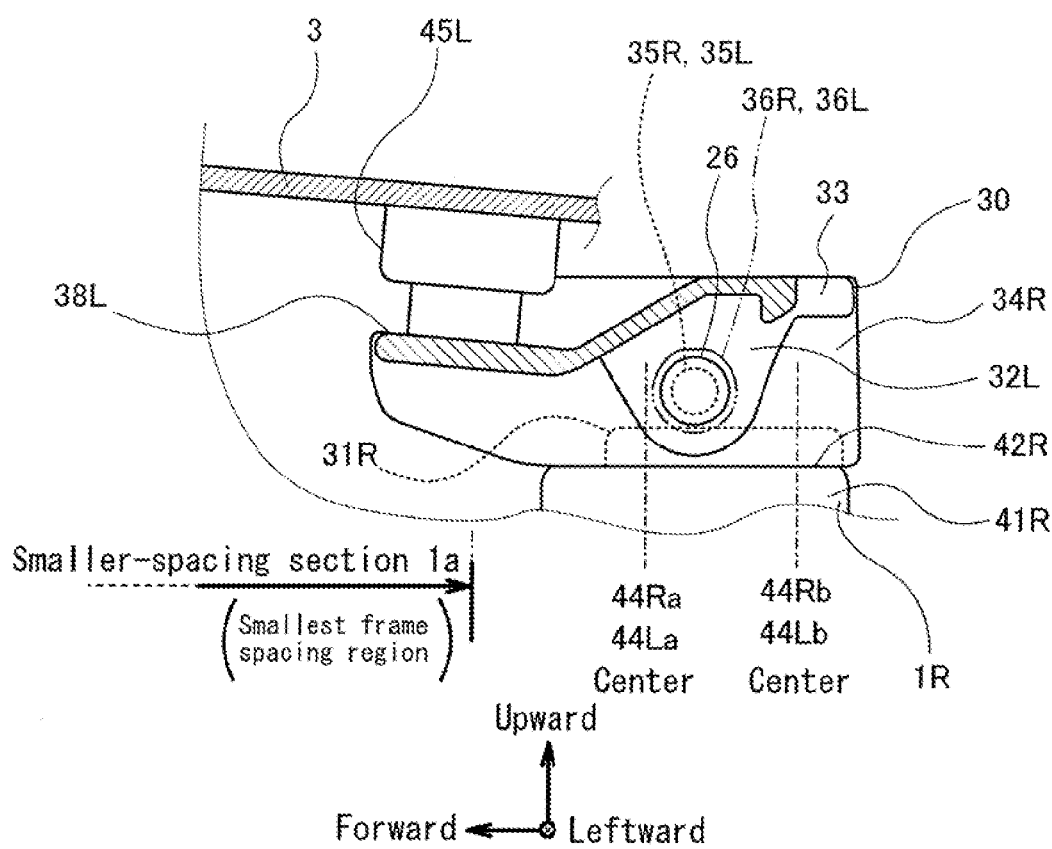
FIG. 5 is a cross-sectional view of the tank support structure taken along a line V-V of FIG. 2.

As shown in FIGS. 2 and 5, the interface of the frame coupling section 31R and of the mounting section 41R protrudes rearward farther than the axis of the pivot shaft 26 does. In this structure, even when the fuel tank 2 is angularly displaced around the axis of the pivot shaft 26 extending in the vehicle width direction, the fuel tank 2 can be supported stably. In the present embodiment, the left coupling member 44L includes a front left coupling member 44La and a rear left coupling member 44Lb. In correspondence with this, the left coupling member insertion hole 37L includes a front left hole 37La and a rear left hole 37Lb, and the left coupling member engagement hole 43L includes a front left hole 43La and a rear left hole 43Lb. The two coupling members 44La, 44Lb are placed at a front side and a rear side of the axis of the pivot shaft 26, respectively. The right coupling members 44R (44Ra, 44Rb), the right coupling member insertion holes 37R (37Ra, 37Rb), and the right coupling member engagement holes 43R (43Ra, 43Rb) have the same configurations as those of the left coupling members 44L (44La, 44Lb), the left coupling member insertion holes 37R (37Ra, 37Rb), and the left coupling member engagement holes 43L (43La, 43Lb), respectively. Since the frame coupling sections 31R, 31L are coupled to the vehicle body frames 1R, 1L, respectively in the above-described manner, the fuel tank 2 can be supported stably such that the fuel tank 2 is angularly displaceable around the axis of the pivot shaft 26.

The configuration corresponding to step (4) will now be described. As shown in FIGS. 2, 3, and 5, the support member 30 includes a pair of seat placement sections 38R, 38L. The pair of seat placement sections 38R, 38L protrude forward in a tongue shape from the outer edge portions of the bridge portion 33 in the vehicle width direction or the pair of longitudinal wall portions 34R, 34L, respectively. In a state in which the frame coupling sections 31R, 31L are coupled to the mounting sections 41R, 41L, respectively, the pair of seat placement sections 38R, 38L are placed between the intermediate portions of the vehicle body frames 1R, 1L, defining the smaller-spacing section 1a, and away from and above the fuel tank 2. In contrast, the front portion of the seat 3 has an inverted-U shape, and a pair of projections 45R, 45L are provided on the lower surface of a ceiling wall of the front portion of the seat 3.

In step (4), as shown in FIGS. 2 and 5, the seat 3 is mounted to the vehicle body frames 1R, 1L (to be precise, the rear frames 10R, 10L) in such a manner that the upper portion of the smaller-spacing section 1a is covered by the front portion of the seat 3 and the projections 45R, 45L of the seat 3 are placed on the pair of seat placement sections 38R, 38L, respectively. This can realize a structure in which the fuel tank 2 is placed between the pair of vehicle body frames 1R, 1L, the support member 30 is placed above the rear portion of the fuel tank 2 in a state in which the support member 30 overlaps with the fuel tank 2 when viewed from above, and the fuel tank 2 is partially covered by the front portion of the seat 3 from above.

In the aforementioned tank support structure, the support member 30 includes the pair of frame coupling sections 31R, 31L, and the pair of tank coupling sections 32R, 32L. The pair of frame coupling sections 31R, 31L are detachably coupled to the pair of mounting sections 41R, 41L provided on the pair of vehicle body frames 1R, 1L, respectively, and the pair of tank coupling sections 32R, 32L are placed inward in the vehicle width direction relative to the pair of frame coupling sections 31R, 31L, respectively and detachably coupled to the tank bracket 20. Because of this structure, the fuel tank 2 can be mounted to the vehicle body frames 1R, 1L, in a state in which members used to couple the fuel tank 2 to the vehicle body frames 1R, 1L are omitted from the vehicle body frames 1R, 1L. Therefore, even when the tank width is increased to be close to the frame spacing, the frame accommodation portion of the fuel tank 2 can be accommodated into the region between the pair of vehicle body frames 1R, 1L, without an interference of the fuel tank 2 with the vehicle body frames 1R, 1L and the members fastened to the vehicle body frames 1R, 1L. Therefore, the tank width can be increased, while avoiding an increase in the frame spacing.

The support member 30 protrudes outward in the vehicle width direction from the fuel tank 2, and the pair of frame coupling sections 31R, 31L are coupled to the mounting sections 41R, 41L, respectively, in locations that are outward in the vehicle width direction relative to the fuel tank 2. In this configuration, even if the members used to couple the fuel tank 2 to the vehicle body frames 1R, 1L extend inward in the vehicle width direction from the vehicle body frames 1R, 1L toward the fuel tank 2, these members can be omitted from the vehicle body frames 1R, 1L by detaching the support member 30 from the vehicle body frames 1R, 1L. Therefore, the tank width can be easily increased to be close to the frame spacing.

The support member 30 includes the seat placement sections 38R, 38L on which the rider's seat 3 is placed from above. Because of this structure, the support member 30 can serve to couple the fuel tank 2 to the vehicle body frames 1R, 1L and serve to support the seat 3. Therefore, the configuration of the straddle-type vehicle 100 can be simplified. The fuel tank 2 can be mounted to the vehicle body frame 1R, 1L, in a state in which the members used to couple the seat 3 to the vehicle body frames 1R, 1L are omitted from the vehicle body frames 1R, 1L. Therefore, the tank width can be easily increased to be close to the frame spacing.

The support member 30 is coupled to both of the pair of vehicle body frames 1R, 1L, and extends in the vehicle width direction. The pair of vehicle body frames 1R, 1L are coupled to each other via the support member 30. This can enhance the stiffness of the vehicle body frames 1R, 1L. Since the support member 30 serves to couple the fuel tank 2 to the vehicle body frames 1R, 1L and enhance the stiffness of the vehicle body frames 1R, 1L, the configuration of the straddle-type vehicle 100 can be simplified.

The frame coupling sections 31R, 31L form a pair in the vehicle width direction, and the seat placement sections 38R, 38L form a pair in the vehicle width direction. In this configuration, since the front portion of the seat 3 is supported at two points which are apart in the axial direction, the seat 3 can be supported stably. Since the pair of vehicle body frames 1R, 1L can support the weight load of the rider and the fuel tank 2 in a dispersed manner, the weight of the vehicle body frames 1R, 1L can be reduced and the structure of the vehicle body frames 1R, 1L can be simplified, while ensuring the support stiffness of the support member 30 and of the vehicle body frames 1R, 1L.

The pair of vehicle body frames 1R, 1L include the mounting sections 41R, 41L to which the support member 30 is detachably coupled, instead of the members used to couple the fuel tank 2 to the vehicle body frames 1R, 1L and the members used to couple the seat 3 to the vehicle body frames 1R, 1L. The mounting sections 41R, 41L are provided in the locations that are rearward relative to the intermediate portions of the vehicle body frames 1R, 1L, defining the smaller-spacing section 1a. In this structure, it is not necessary to make the tank width smaller than frame spacing at the smaller-spacing section 1a which is set as small as possible, to avoid an interference of the fuel tank 2 with the mounting sections 41R, 41L. Therefore, the tank width can be set to a sufficiently large one.

The seat placement sections 38R, 38L are placed in front of the frame coupling sections 31R, 31L, respectively. Since the front portion of the seat 3 is placed on the seat placement sections 38R, 38L in a location that is as forward as possible, the seat 3 can be stably supported. Since the mounting sections 41R, 41L are located rearward relative to the smaller-spacing section 1a and the seat placement sections 38R, 38L are located in front of the frame coupling sections 31R, 31L, the tank width can be increased, and the seat 3 can be stably supported.

The frame coupling sections 31R, 31L are coupled to the vehicle body frames 1R, 1L, respectively, in a state in which the frame coupling sections 31R, 31L are placed on the mounting sections 41R, 41L to overlap with the mounting sections 41R, 41L, respectively, from above. This makes it possible to avoid a situation in which a strong shear load caused by the weight load of the rider and the fuel tank 2 is applied to the surface of the frame coupling section 31R and the surface of the mounting section 41R which are joined together, and to the surface of the frame coupling section 31L and the surface of the mounting section 41L which are joined together. Therefore, the support member 30 can be mounted to the vehicle body frames 1R, 1L with a high reliability.

The mounting sections 41R, 41L protrude inward in the vehicle width direction from the inner surfaces of the vehicle body frames 1R, 1L (rear frames 10R, 10L), respectively. However, the spacing (distance) between the pair of mounting sections 41R, 41L in the vehicle width direction is not smaller than the frame spacing at the smaller-spacing section 1a. Because of this, the tank width can be increased, and mounting reliability can be improved. Further, the members (e.g., the coupling member engagement holes 43R, 43L, the coupling members 44R, 44L) used to couple the frame coupling sections 31R, 31L to the mounting sections 41R, 41L can be covered by the vehicle body frames 1R, 1L, and are not seen from outside. As a result, the external appearance of the straddle-type vehicle 100 is less likely to be degraded.

This will be described more specifically. The front portions of the rear frames 10R, 10L constitute the side walls which are vertically elongated. In this structure, the placement surfaces 42R, 42L can be located below the upper edges of the rear frames 10R, 10L, respectively. Further, the coupling member engagement holes 43R, 43L extending downward from the placement surfaces 42R, 42L, respectively, can be located above the lower edges of the rear frames 10R, 10L, respectively. Moreover, in the locations where the mounting sections 41R, 41L are provided, the rear frames 10R, 10L are vertically elongated. Therefore, even when a downward load caused by the weight of the rider or the like is applied to the rear frames 10R, 10L, the rear frames 10R, 10L are less likely to be deformed. In this way, the good external appearance of the straddle-type vehicle 100 can be maintained, and the support stiffness of the straddle-type vehicle 100 can be enhanced.

The seat placement sections 38R, 38L are located above the frame coupling sections 31R, 31L, respectively, and coupled to the frame coupling sections 31R, 31L via the longitudinal wall portions 34R, 34L, respectively. Since the modulus of the sections of the longitudinal wall portions 34R, 34L with respect to the downward load is large, the support stiffness of the support member 30 and of the vehicle body frames 1R, 1L can be enhanced. The frame coupling sections 31R, 31L are placed below the upper edges of the vehicle body frames 1R, 1L, respectively. Therefore, even when the seat placement sections 38R, 38L are placed above the frame coupling sections 31R, 31L, respectively, the height of the seat 3 is not increased. Therefore, the support stiffness can be enhanced, and the rider can easily ground their feet.

The seat placement sections 38R, 38L are located closer to the frame coupling sections 31R, 31L in the vehicle width direction, than the tank coupling sections 32R, 32L are, respectively. The seat placement sections 38R, 38L can be made as close to the vehicle body frames 1R, 1L as possible, respectively. This makes it possible to prevent a situation in which a strong bending load corresponding to the downward load from the seat 3 is applied to the locations (e.g., longitudinal wall portions 34R, 34L) at which the seat placement sections 38R, 38L are coupled to the frame coupling sections 31R, 31L, respectively. Therefore, the support stiffness of the support member 30 and of the vehicle body frames 1R, 1L can be enhanced.

The above-described embodiment is merely exemplary, and the above-described configuration may be suitably changed within the scope of the invention. For example, the support member 30 may not support the seat 3. Even in that case, the tank width can be easily increased to be close to the frame spacing, if the members used to support the seat 3 are detachably coupled to the vehicle body frames 1R, 1L.

The assembling steps of the tank support structure are not limited to the above-described steps (1) to (4), so long as the frame accommodation portion of the fuel tank 2 is accommodated into the region between the vehicle body frames 1R, 1L, before the support member 30 is mounted to the vehicle body frames 1R, 1L. Steps (1) to (3) may be modified into the following steps (1A) to (3A), and steps (2A) and (3A) may be reversed. (1A) The fuel tank 2 is positioned with respect to the vehicle body frames 1R, 1L without the support member 30 in such a manner that the frame accommodation portion of the fuel tank 2 is accommodated into the region between the vehicle body frames 1R, 1L from above. (2A) The support member 30 is coupled to the tank bracket 20. (3A) The support member 30 is coupled to the vehicle body frames 1R, 1L.

The use of the member used to couple the fuel tank 2 to the vehicle body frames 1R, 1L is not limited to a case where the support member 30 which is a single member is coupled to both of the pair of vehicle body frames 1R, 1L, so long as the member is detachably coupled to at least one of the pair of vehicle body frames 1R, 1L. For example, a pair of support members may be separately coupled to the pair of vehicle body frames 1R, 1L, respectively. Further, one or more support members may be coupled to only one of the pair of vehicle body frames 1R, 1L.

The present invention is suitably used in straddle-type vehicles such as an automated three-wheeled vehicle or an ATV (all-terrain vehicle) as well as a motorcycle.

Numerous improvements and alternative embodiment of the invention will be apparent to those skilled in the art in view of the foregoing description. Accordingly, the description is to be construed as illustrative only, and is provided for the purpose of teaching those skilled in the art the best mode of carrying out the invention. The details of the structure and/or function may be varied substantially without departing from the spirit of the invention.

What is claimed is:

1. A straddle-type vehicle comprising:
a pair of vehicle body frames arranged in a vehicle width direction of a vehicle body and extending in a vehicle length direction of the vehicle body;
a fuel tank placed between the pair of vehicle body frames;
a tank bracket fastened to an upper surface of the fuel tank; and
a support member which couples the tank bracket to at least one of the pair of vehicle body frames, the support member including:
a frame coupling section which has a coupling member insertion hole into which a coupling member is inserted and is detachably coupled to a mounting section provided on at least one of the pair of vehicle body frames by the coupling member inserted into the coupling member insertion hole; and
a tank coupling section placed inward in the vehicle width direction relative to the frame coupling section and detachably coupled to the tank bracket,
wherein the mounting section is provided on an inner surface of the at least one of the pair of vehicle body frames and covered thereby in the vehicle width direction.

2. The straddle-type vehicle according to claim 1,
wherein the support member protrudes outward in the vehicle width direction from the fuel tank, and
wherein the frame coupling section is coupled to the mounting section in a location that is outward in the vehicle width direction relative to the fuel tank.

3. The straddle-type vehicle according to claim 1,
wherein the support member is coupled to the pair of vehicle body frames and extends in the vehicle width direction.

4. The straddle-type vehicle according to claim 1,
wherein the frame coupling section is coupled to the at least one of the pair of vehicle body frames in a state in which the frame coupling section is placed on the at least one of the pair of vehicle body frames to overlap with the at least one of the pair of vehicle body frames, from above.

5. The straddle-type vehicle according to claim 1, comprising:
a seat on which a rider can be seated in a straddle posture,
wherein the support member includes a seat placement section on which the seat is placed from above.

6. The straddle-type vehicle according to claim 5,
wherein the seat placement section is located in front of the frame coupling section.

7. The straddle-type vehicle according to claim 6,
wherein the seat placement section is placed closer to the frame coupling section in the vehicle width direction than the tank coupling section is.

8. The straddle-type vehicle according to claim 1,
wherein the fuel tank is coupled to the support member such that the fuel tank is angularly displaceable around an axis of a pivot shaft extending in the vehicle width direction, and
wherein an interface of the frame coupling section and of the mounting section protrudes rearward farther than the axis of the pivot shaft.

9. The straddle-type vehicle according to claim 1,
wherein the tank coupling section is placed between an upper end and a lower end of the support member in a vertical direction.

10. A straddle-type vehicle comprising:
a pair of vehicle body frames arranged in a vehicle width direction of a vehicle body and extending in a vehicle length direction of the vehicle body;
a fuel tank placed between the pair of vehicle body frames;
a tank bracket fastened to an upper surface of the fuel tank; and
a support member which couples the tank bracket to at least one of the pair of vehicle body frames,
wherein the support member includes:
a frame coupling section detachably coupled to a mounting section provided on at least one of the pair of vehicle body frames; and
a tank coupling section placed inward in the vehicle width direction relative to the frame coupling section and detachably coupled to the tank bracket,
wherein the pair of vehicle body frames constitute a smaller-spacing section in intermediate portions of the vehicle body frames in the vehicle length direction, the smaller-spacing section being smaller in a spacing between the pair of vehicle body frames in the vehicle width direction, and
wherein the mounting section is provided on the at least one of the pair of vehicle body frames, in a location that is rearward relative to the smaller-spacing section.

11. A straddle-type vehicle comprising:
a pair of vehicle body frames arranged in a vehicle width direction of a vehicle body and extending in a vehicle length direction of the vehicle body;
a fuel tank placed between the pair of vehicle body frames;
a tank bracket fastened to an upper surface of the fuel tank;
a support member which couples the tank bracket to at least one of the pair of vehicle body frames; and
a seat on which a rider can be seated in a straddle posture,
the support member including:
a frame coupling section which has a coupling member insertion hole into which a coupling member is inserted and is detachably coupled to a mounting section provided on at least one of the pair of vehicle body frames by a coupling member inserted into the coupling member insertion hole; and
a tank coupling section placed inward in the vehicle width direction relative to the frame coupling section and detachably coupled to the tank bracket,
wherein the frame coupling section includes a pair of frame coupling sections in the vehicle width direction,
wherein the support member includes a bridge portion extending in the vehicle width direction above the pair of frame coupling sections, a pair of longitudinal wall portions vertically connecting a pair of outer edge portions of the bridge portion in the vehicle width direction to the pair of frame coupling sections, respectively, and a pair of seat placement sections on which the seat is placed from above, and
wherein the pair of seat placement sections are placed on both sides, respectively, in the vehicle width direction, and protrude forward from the outer edge portions of the bridge portion in the vehicle width direction or the pair of longitudinal wall portions, respectively.

* * * * *